(12) United States Patent
Yokota et al.

(10) Patent No.: US 7,355,316 B2
(45) Date of Patent: Apr. 8, 2008

(54) ELECTRICAL TOOL

(75) Inventors: Tomoyoshi Yokota, Ibaraki (JP);
Hirokazu Yoshida, Niigata (JP);
Satoru Gunji, Ibaraki (JP)

(73) Assignee: Hitachi Koki Co. Ltd., Tokyo (JP)

( * ) Notice: Subject to any disclaimer, the term of this patent is extended or adjusted under 35 U.S.C. 154(b) by 0 days.

(21) Appl. No.: 11/401,227

(22) Filed: Apr. 11, 2006

(65) Prior Publication Data

US 2006/0250044 A1 Nov. 9, 2006

(30) Foreign Application Priority Data

Apr. 13, 2005 (JP) .......................... P2005-115500

(51) Int. Cl.
*H02K 1/22* (2006.01)
(52) U.S. Cl. ...................................... 310/261
(58) Field of Classification Search ................ 310/261, 310/154.01–154.49, 216
See application file for complete search history.

(56) References Cited

U.S. PATENT DOCUMENTS 4,955,128 A * 9/1990 Sogabe et al. ................ 29/596

7,064,467 B2 * 6/2006 Yokota et al. ............... 310/215

FOREIGN PATENT DOCUMENTS

| JP | 2004-080969 | | 3/2004 |
| JP | 2004-254394 | * | 9/2004 |
| JP | 2006-115666 | * | 4/2006 |

* cited by examiner

*Primary Examiner*—Dang Le
*Assistant Examiner*—Nguyen N. Hanh
(74) *Attorney, Agent, or Firm*—Mattingly, Stanger, Malur & Brundidge, P.C.

(57) ABSTRACT

In the portable electrical circular saw (electrical tool) in which a commutator motor (permanent magnet motor) is mounted in a motor case (housing) which is integrally formed in a tube shape, the commutator motor includes a stator fixed to an inner circumferential surface of the motor case and a rotor which is rotatably disposed in the stator, and a plate having a plurality of protrusions is disposed on at least one of the both axial ends of a rotor core of the rotor, an outer diameter of at least two protrusions of the plate is larger than an outer diameter of the rotor core and smaller than an inner diameter of the stator.

13 Claims, 4 Drawing Sheets

ELECTRICAL TOOL

BACKGROUND OF THE INVENTION

1. Field of the Invention

The present invention relates to an electrical tool including a permanent magnet motor as a driving source.

2. Description of Related Art

A permanent magnet motor such as a commutator motor capable of obtaining a high output with a small size is used as a driving source of an electrical tool (for example, see Patent Document 1). In an electrical tool using a commutator motor as a driving source, as shown in FIG. 7, a commutator motor 106 includes a stator 116 fixed to an inner circumferential surface of a motor case 105 and a rotor 117 rotatably disposed in the stator 116. In addition, plates 122 and 123 including a plurality of slot portions having the substantially same shape as that of slots of a rotor core 119 and protrusions are disposed at the both axial ends of the rotor core 119 of the rotor 117.

As shown in FIG. 7, in the electrical tool including the motor case 105 which is integrally formed in a tube shape, the commutator motor 106 is mounted by previously inserting and fitting the stator 116 including a permanent magnet 118 into the motor case 105 and then inserting a rotor unit including the rotor 117 thereinto.

The rotor unit is formed by mounting a commutator 120, a cooling fan 111, and bearings 108 and 109 on a shaft 107 for supporting the rotor core 119. Upon inserting, the bearing 109 passes through the stator 116 in the motor case 105 and fitted into a bearing portion 105a of the motor case 105.

Patent Document 1 is Japanese Patent Unexamined Publication No. 2004-080969.

SUMMARY

However, in the conventional electrical tool shown in FIG. 7, when the rotor unit is inserted into the motor case 105 such that the commutator motor 106 is mounted, the rotor core 119 is attracted to the permanent magnet 118 by magnetic flux of the permanent magnet 118 of the stator 116 and thus the rotor 117 cannot be coaxially inserted into the stator 116. In addition, as shown, axial misalignment δ is caused between the shaft 107 and the bearing portion 105a of the motor case 105 and thus the bearing 109 cannot be smoothly fitted into the bearing portion 105a. Accordingly, mounting performance deteriorates.

In addition, when a strong rare-earth based magnet is used as the permanent magnet 118 of the stator 116, the rotor core 119 bonded to the permanent magnet 118 cannot be easily separated upon attaching. Thus, working power for separating the rotor core 119 from the permanent magnet 118 is required and thus man-hour therefor increases.

SUMMARY OF INVENTION

An object of the present invention is to provide an electrical tool in which a permanent magnet motor can be smoothly mounted without requiring excess working power and man-hour.

According to a first aspect of the present invention, there is provided an electrical tool in which a permanent magnet motor is mounted in a housing which is integrally formed in a tube shape, the permanent magnet motor includes a stator fixed to an inner circumferential surface of the housing and a rotor which has a rotor core and is rotatably disposed in the stator, a plate having a plurality of protrusions is disposed on at least one of the both axial ends of the rotor core of the rotor, and rotation of the permanent magnet motor is delivered to the tool to drive the tool, wherein an outer diameter of at least two protrusions of the plate is larger than an outer diameter of the rotor core and smaller than an inner diameter of the stator.

According to a second aspect of the present invention, in the first aspect, the plate is disposed at a front end of a direction for inserting the rotor into the stator when the permanent magnet motor is mounted.

According to a third aspect of the present invention, in the first aspect or second aspect, the protrusions of the plate are disposed outer than the axial ends of the stator in an axial direction.

According to a fourth aspect of the present invention, in any one of first, second, and third aspects, at least one of the protrusions of the plate having the outer diameter is positioned in inner surfaces of permanent magnets of the stator including a plurality of permanent magnets having different poles in a circumferential direction.

According to a fifth aspect of the present invention, in the fourth aspect, the end of a shaft for supporting the rotor at a side of the plate is rotatably supported by a housing bearing portion through a bearing, and, when a distance from an end of a rotor inserting side of the permanent magnets of the stator to a surface of a bearing which is fitted into the housing bearing portion is A, a distance from an end of the rotor core side of the protrusions of the plate to the surface of the bearing which is fitted into the housing bearing portion is B, and a distance from the end of the rotor inserting side of the permanent magnets of the stator to an axial end of an opening side of the housing bearing portion is C, A, B, and C satisfy a relationship of C<B<A.

According to the first and second aspects, when the rotor is inserted into the housing such that the permanent magnet motor is mounted, the protrusions of the plate first come in contact with the inner circumferential surface of the stator to prevent the rotor core from being attracted to the magnet although the rotor core is attracted to the stator by magnetic flux of the magnet. Thus, the rotor is always separated from the stator and the rotor can be smoothly inserted into the housing while being guided by the plate. In addition, it is possible to smoothly assemble the permanent magnet motor with excellent workability, without requiring excess working power or man-hour.

In addition, since the shaft and the stator are coaxially held by the plate, axial misalignment between the shaft and the housing bearing portion is removed, and the plate functions as a guide for accurately guiding the bearing attached to the end of the shaft into the housing bearing portion. Since the bearing is always accurately fitted into the housing bearing portion, assembling performance of the permanent magnet motor is improved.

According to the third aspect, since the protrusions of the plate are disposed outer than the axial ends of the stator in the axial direction, the plate which rotates while the permanent magnet motor is driven does not come in contact with the permanent magnet and the rotor can smoothly rotate.

According to the fourth aspect, since at least one of the protrusions of the plate is positioned in the inner surface of the magnets of the stator, the rotor is always separated from the stator by action of the protrusions of the plate. In addition, the permanent magnet motor can be smoothly mounted without requiring excess working power or man-hour.

According to the fifth aspect, since the protrusions of the plate function as a guide for holding coaxially the shaft and the rotor with respect to the stator such that axial misalignment between the bearing and the housing bearing portion is prevented from being generated until the bearing attached to the end of the shaft is inserted into the housing bearing portion, it is possible to mount the permanent magnet motor with more excellent workability.

DETAILED DESCRIPTION OF THE EMBODIMENTS

Hereinafter, embodiments of the present invention will be described with reference to the attached drawings.

First Embodiment

Figure 1:
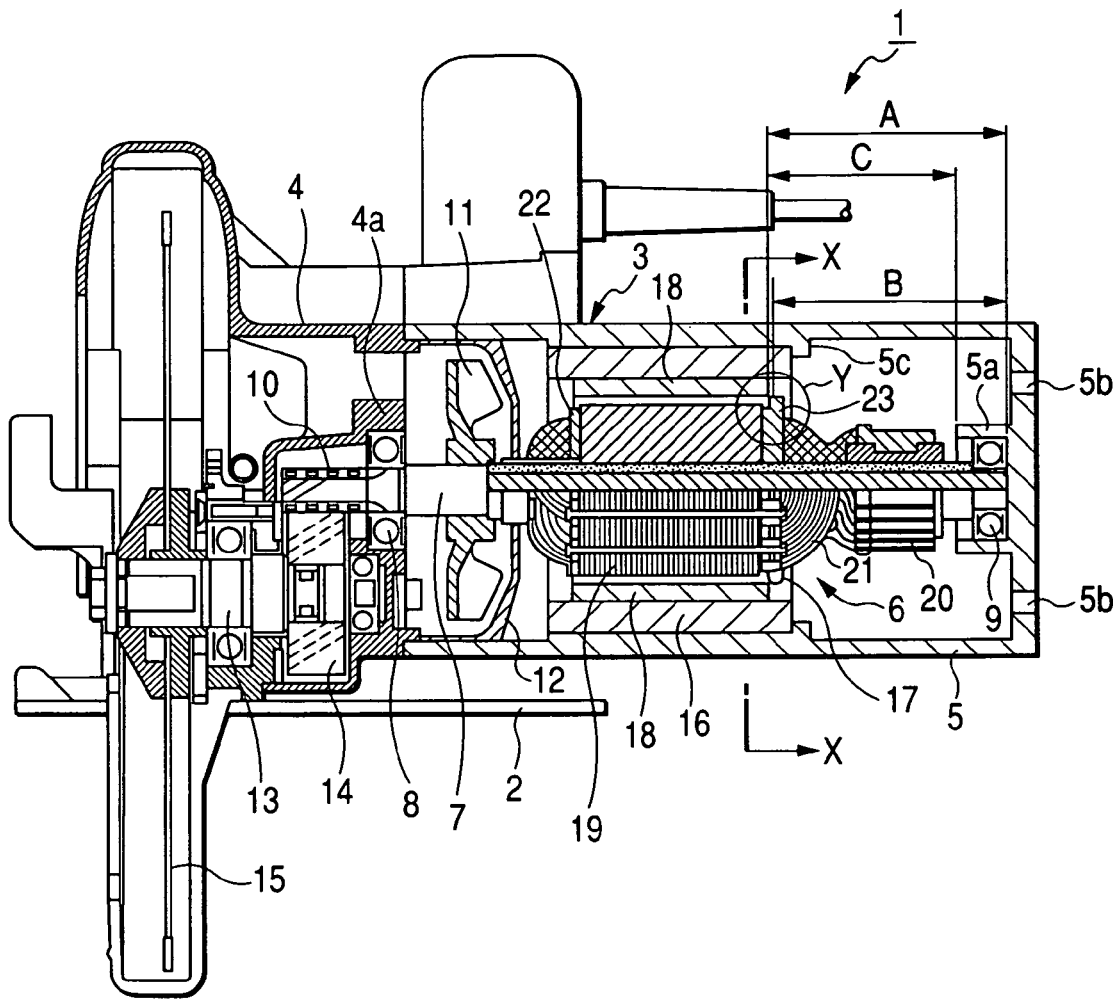
FIG. 1 is a side cross-sectional view of a portable electrical circular saw according to a first embodiment of the present invention.
Figure 2:
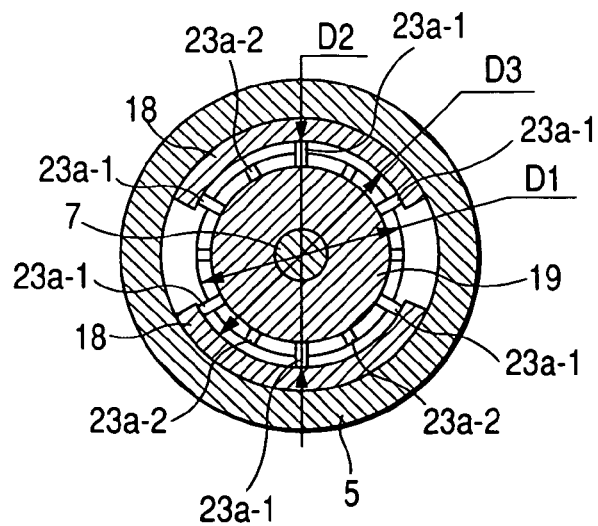
FIG. 2 is a cross-sectional view taken along line X-X of FIG. 1.
Figure 3:
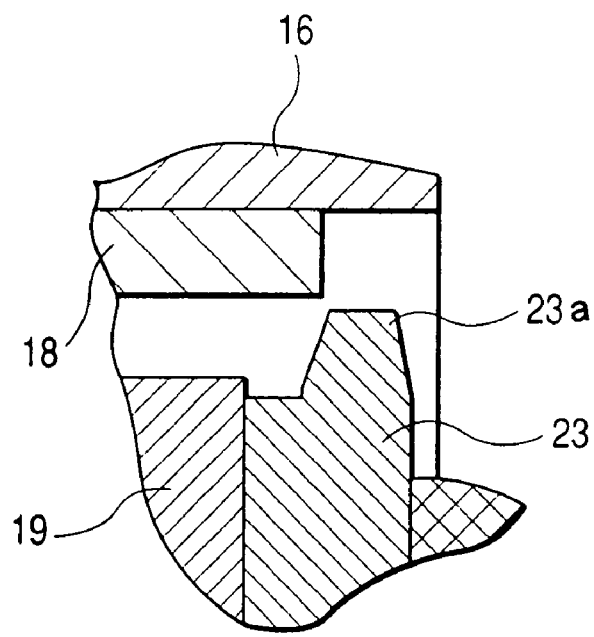
FIG. 3 is an enlarged detailed view of a Y portion of FIG. 1.
Figure 4:
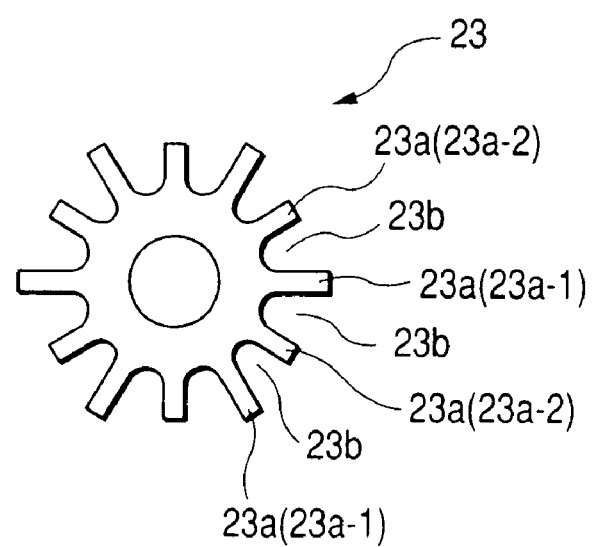
FIG. 4 is a front view of a plate of the portable electrical circular saw according to the first embodiment of the present invention.
Figure 5:
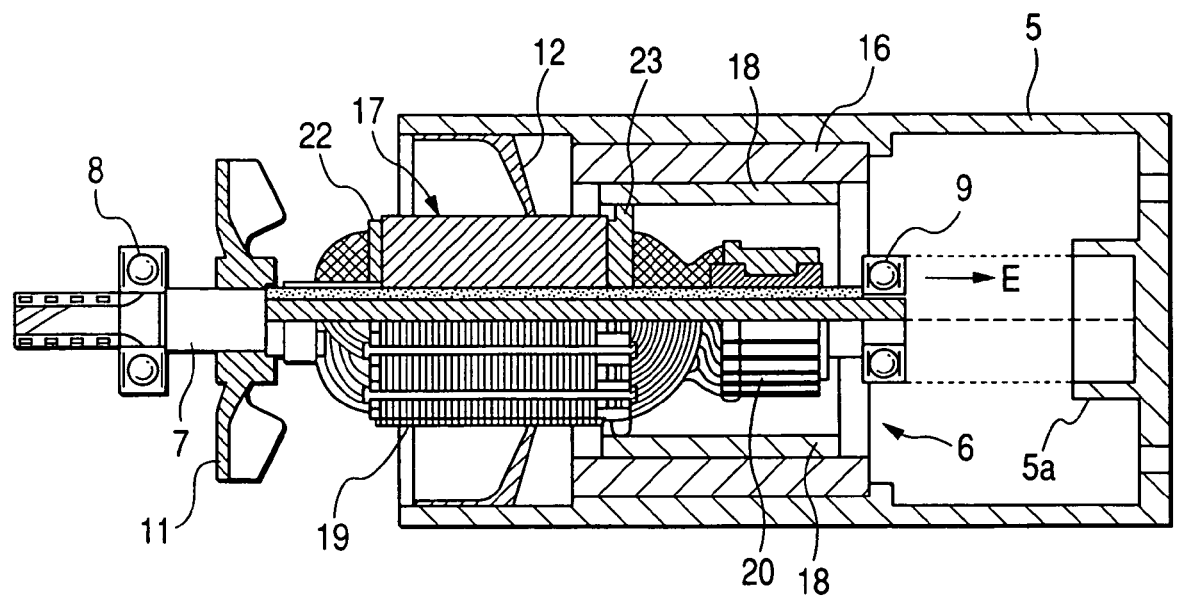
FIG. 5 is a partial side cross-sectional view showing a method of mounting a commutator motor in the portable electrical circular saw according to the first embodiment of the present invention.

FIG. 1 is a side cross-sectional view of a portable electrical circular saw according to a first embodiment of the present invention, FIG. 2 is a cross-sectional view taken along line X-X of FIG. 1, FIG. 3 is an enlarged detailed view of a Y portion of FIG. 1, FIG. 4 is a front view of a plate, and FIG. 5 is a partial side cross-sectional view showing a method of mounting a commutator motor.

In the portable electrical circular saw 1 shown in FIG. 1, reference numeral 2 denotes a base and reference numeral 3 is a housing. The housing 3 is configured by integrally bonding an inner case 4 of a front portion and a motor case 5 of a rear portion. In addition, a commutator motor 6 is mounted in the motor case 5. A front end of a shaft 7 which is an output shaft of the commutator motor 6 is rotatably supported by a bearing portion 4a through a bearing 8 and a rear end thereof is rotatably supported by a bearing portion (hereinafter, referred to as "housing bearing portion) 5a of the motor case 5 through a bearing 9. Here, the housing bearing portion 5a includes a tubular concave portion, which has a bottom and is horizontally protruded from the inner rear end of the motor case 5. When the commutator motor 6 is mounted as described below, the bearing 9 is inserted and fitted into a front opening portion of the housing bearing portion 5a. In addition, a plurality of windows 5b is formed in a rear wall of the motor case 5.

In addition, a pinion 10 is formed on a portion protruded from the bearing 8 of the shaft 7 to the inner case 4 forwardly, and a cooling fan 11 is attached at a rear side of the bearing 8 of the shaft 7, and fan guide 12 is fixed to an inner circumferential surface of the motor case 5 in the vicinity of the cooling fan 11. Furthermore, a driving shaft 13 is formed in the inner case 4 parallel to the shaft 7, and a decelerating gear 14 attached to the driving shaft 13 is engaged with the pinion 10 formed at the front end of the shaft 7. In addition, a saw blade 15 having a circular plate shape is attached to the front end of the driving shaft 13.

The motor case 5 is integrally formed in a tube shape, and the commutator motor 6 mounted in the motor case 5 includes a stator 16 fixed to an inner circumferential surface of the motor case 5 and a rotor 17 disposed on the shaft 7.

The stator 16 is positioned by a ring-shaped rib 5c protruded from the inner circumferential surface of the motor case 5. Two permanent magnets 18 having poles (N and S poles) are fixed to the inner circumferential surface of the motor case 5.

In addition, the rotor 17 is fixed to the shaft 7 and includes a rotor core 19 having 12 slots and rotatably disposed in the permanent magnet 18 of the stator 16 and a commutator 20 fixed to the shaft 7. The commutator 20 includes a number of commutator pieces which is an integral multiple of the number of the slots of the rotor core 19.

Plates 22 and 23 for preventing a winding wire 21 from being damaged when winding the wiring wire 21 on the slots provided in the rotor core 19 are provided on the both axial ends of the rotor core 19 of the rotor 17. The plates 22 and 23 are made of a non-magnetic material. The plates 22 and 23 are made of paper or plastic having high electrical insulation property and are formed in the same shape as the horizontal cross-sectional shape of the rotor core 19. The plate 23 at a rear side (which is first inserted into the motor case 5 when mounting the commutator motor 6) includes 12 protrusions 23a which are radially formed with a same pitch in a circumferential direction and slot portions 23b having the same number as that of the protrusions 23a and disposed between the protrusions 23a, as shown in FIG. 4. On the other hand, when the plates 22 and 23 are made of paper, hard paper which is not deformed is used.

The winding wire 21 is wound on the rotor core 19 and the slot portions 23b formed in the plates 22 and 23 to hold the rotor core 19 and the plates 22 and 23 and the end of the winding wire 21 is connected to the commutator pieces of the commutator 20.

Here, six protrusions 23a-1 which is a half of the 12 protrusions 23a have a large outer diameter (accurately, circumscribed circle diameter) and the other six protrusions 23a-2 have a small outer diameter. The protrusions 23a-1 having the large outer diameter and the protrusions 23a-2 having the small outer diameter are alternately arranged in the circumferential direction. As shown in FIG. 2, the outer diameter D2 of the protrusion 23a-1 is larger than the outer diameter D1 of the rotor core 19 and slightly smaller than the inner diameter D3 of the permanent magnet 18 (D1<D2<D3). In addition, a half (three) of the protrusions 23a-1 having the large outer diameter is positioned in the inner circumferential direction range of the permanent magnet 18.

Meanwhile, although, in the present embodiment, three protrusions 23a-1 having the large outer diameter are positioned in the inner circumferential direction range of the permanent magnet 18, at least one protrusion 23a-1 may be positioned in the inner circumferential direction range of the permanent magnet 18. In addition, although, in the present embodiment, six protrusions 23a-1 which are a half of the twelve protrusions 23a of the plate 23 have the large outer diameter, all the protrusions 23a may have the large outer diameter.

In addition, as shown in FIG. 1, the axial length of the rotor core 19 is shorter than the axial length of the permanent magnet 18 and the end of the rotor core 19 is positioned inner than the end of the permanent magnet 18 in the axial direction. To this end, as shown in FIG. 3, the outer diameter (accurately, circumscribed circle diameter) of a portion of the protrusion 23a of the plate 23 positioned in the permanent magnet 18 is smaller than the inner diameter D3 of the permanent magnet 18 such that the portion does not come in contact with the inner surface of the permanent magnet 18 by fluctuation of the rotor 17 upon driving the motor. The axial size of the protrusion 23a gradually increases from a side of the rotor core 19 and a maximum outer-diameter portion of the protrusion 23a is positioned at a position separated from the inner-diameter surface of the permanent magnet 18 outward. On the other hand, the plate 23 may be halved into a portion which is positioned in the permanent magnet 18 and a portion having the maximum outer-diameter protrusion in the axial direction. In addition, the plate 23 may be deviated from the rotor core 19 in the axial direction and may be disposed outer than the permanent magnet 18 in the axial direction.

In addition, in the present embodiment, as shown in FIG. 1, when a distance from the rear end (end of the commutator 20 side) of the permanent magnet 18 of the stator 16 to a surface of the bearing 9 which is fitted into the housing bearing portion 5a is A, a distance from the front end (end of the rotor core 19 side) of the protrusion 23a of the plate 23 to the surface of the bearing which is fitted into the housing bearing portion 5a is B, and a distance from the rear end (end of the commutator 20 side) of the permanent magnet 18 of the stator 16 to the axial end of an opening side of the housing bearing portion 5a is C, A, B, and C satisfy a relationship of C<B<A.

Now, an operation of the portable electrical circular saw 1 having the above-described configuration will be described.

When the base 2 of the portable electrical circular saw 1 is loaded on an amputated material (not shown) such as wood and a switch (not shown) is turned on, power is supplied from the commutator 20 to the rotor 17 of the commutator motor 6 through a carbon brush (not shown) and rotation torque is generated in the rotor 17. By this rotation torque, the shaft 7 rotates at a predetermined speed. In addition, the rotation of the shaft 7 is decelerated by the pinion 10 and the decelerating gear 14 and delivered to the driving shaft 13, and the driving shaft 13 and the saw blade 15 attached thereto rotate. In this state, the amputated material is cut by the saw blade 15 by moving the portable electrical circular saw 1 on the amputated material.

Next, in the portable electrical circular saw 1, a method of mounting commutator motor 6 in the motor case 5 will be described with reference to FIG. 5.

In order to mount the commutator motor 6 in the motor case 5, the stator 16 including the permanent magnet 18 and the fan guide 12 are previously inserted into the opening of the motor case 5 and assembled in the motor case 5. Then, the rotor unit obtained by mounting the rotor 17, the cooling fan 11, and the bearings 8 and 9 to the shaft 7 is horizontally inserted into the motor case 5 in a direction indicated by an arrow E in a state that the front end of the shaft 7 is supported such that the bearing 9 is first inserted.

Then, the commutator 20 and the bearing 9 of the rotor unit first pass through the stator 16 and the rotor core 19 is then inserted into the stator 16. At this time, a force for attracting the rotor core 19 to the permanent magnet 18 by the permanent magnet 18 acts.

Since the plate 23 is positioned at an insertion direction side when the rotor 17 is inserted into the stator 16 with respect to the position of the rotor core 19, the plate 23 is already positioned in the permanent magnet 18 of the stator 16 before the rotor core 19 enters into the permanent magnet 18, and the protrusions 23a-1 having the large outer diameter come in contact with the inner circumferential surface of the permanent magnet 18 earlier than the rotor core 19. To this end, the rotor core 19 is prevented from be attracted to the permanent magnet 18 by the plate 23, and the rotor core 19 is positioned apart from the permanent magnet 18 of the stator 16 in a diameter direction. Thus, the rotor core 19 can be smoothly inserted into the motor case 5 with excellent workability while being guided by the plate 23 and excess working power or man-hour required for separating the rotor core 19 from the permanent magnet 18 is unnecessary.

As described above, since the outer diameter D2 of the protrusion 23a-1 of the plate 23 is larger than the outer diameter D1 of the rotor core 19 and slightly smaller than the inner diameter D3 of the permanent magnet 18 (see FIG. 2), the protrusion 23a-1 of the plate 23 can pass through the permanent magnet 18 while the rotor core 19 is guided while being separated from the inner surface of the permanent magnet 18.

In addition, as described above, since the three protrusions 23a-1 of the plate 23, which have the large outer diameter, are positioned in the inner circumferential direction range of the permanent magnet 18, the rotor core 19 is always separated from the permanent magnet 18 by the action of the protrusions 23a-1 and can be surely prevented from being attracted to the permanent magnet 18.

When the rotor core 19 passes through the permanent magnet 18, the bearing 9 is inserted and fitted into the housing bearing portion 5a of the motor case 5. At this time, since the shaft 7 and the stator 16 are coaxially held by the protrusions 23a-1 of the plate 23, the axial misalignment between the shaft 7 and the housing bearing portion 5a is removed and the plate 23 functions as a guide for accurately guiding the bearing 9 to the housing bearing portion 5a. In addition, the bearing 9 is always accurately inserted into the housing bearing portion 5a and thus the mounting performance of the commutator motor 6 is improved.

As described above, since the distances A, B, and C shown in FIG. 1 satisfy a relationship of C<B<A, the protrusions 23a-1 of the plate 23 function as a guide for coaxially holding the shaft 7 and the rotor 17 with respect to the stator 16 such that the axial misalignment between the bearing 9 and the housing bearing portion Sa is prevented from being generated until the bearing 9 is inserted into the housing bearing portion 5a. Accordingly, it is possible to mount the commutator motor with more excellent workability.

In addition, when the inner case 4 having the bearing portion 4a of the bearing 8 at the front end is attached to the motor case 5, both axial ends of the shaft 7 are rotatably supported by the inner case 4 and the motor case 5, thereby completing assembling of the commutator motor 6.

Since the protrusions 23a of the plate 23 are positioned other than the both axial ends of the permanent magnet 18 of the stator 16 in the axial direction in a state that the commutator motor 6 is mounted, the plate 23 which rotates while the commutator motor 6 is driven does not come in contact with the permanent magnet 18 and the rotor 17 can smoothly rotate.

In addition, since the outer diameter D2 of the protrusion 23a-1 of the plate 23 is slightly smaller than the inner diameter D3 of the permanent magnet 18, an interval between the protrusion 23a-1 and the inner circumferential surface of the permanent magnet 18 becomes smaller. In addition, since the protrusions 23a of the plate 23 which rotate at a high speed blow off dust, the dust sucked into the motor case 5 together with air through the window 5b of the motor case 5 by the rotation of the cooling fan 11 hardly enters between the rotor core 19 and the permanent magnet 18. Accordingly, durability of the commutator motor 6 is improved and a life span thereof increases.

Second Embodiment

Next, a second embodiment of the present invention will be described with reference to FIG. 6.

Figure 6:
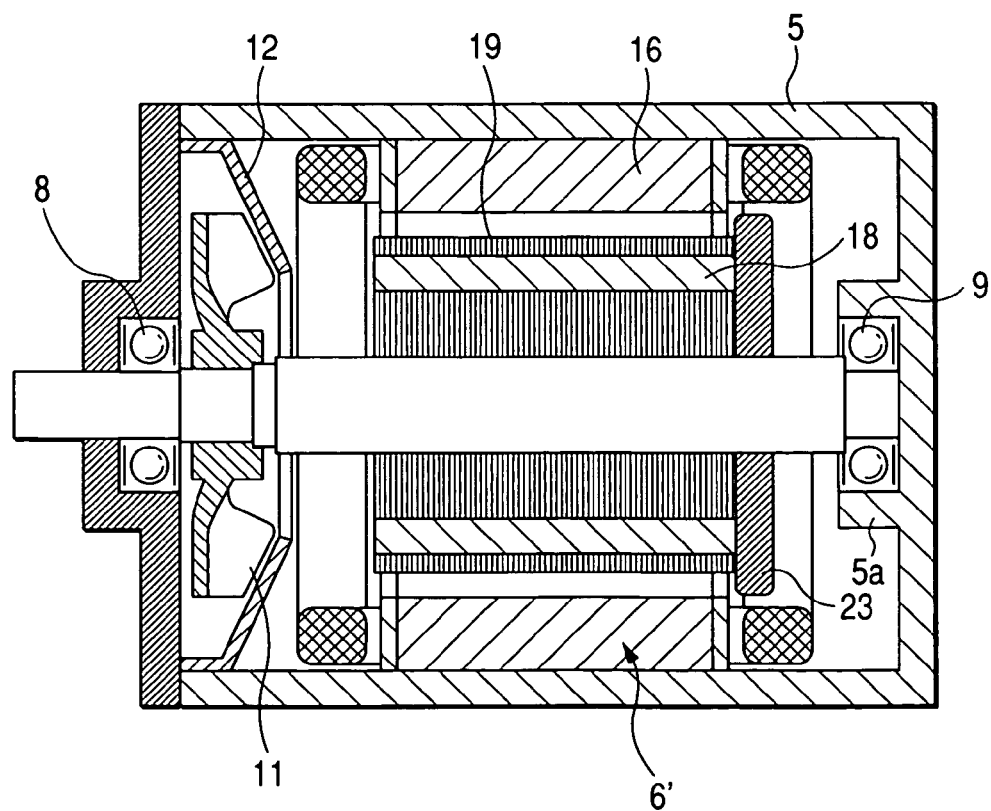
FIG. 6 is a side cross-sectional view of a commutatorless motor portion of an electrical tool according to a second embodiment of the present invention.
Figure 7:
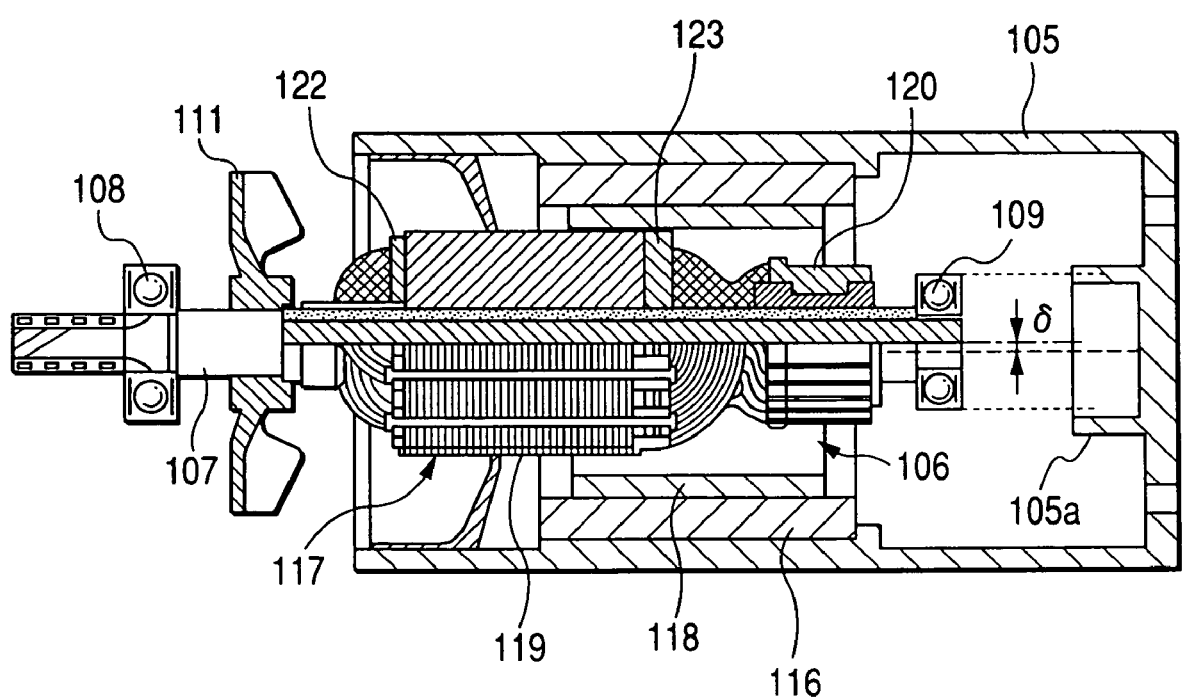
FIG. 7 is a side cross-sectional view showing a method of mounting a commutator motor in a conventional electrical tool.

FIG. 6 is a side cross-sectional view of a commutatorless motor portion of an electrical tool according to the second embodiment of the present invention. In the figure, the same elements as those shown in FIG. 1 are denoted by the same reference numerals and their description will be omitted.

A commutatorless motor 6' used as a driving source of the electrical tool according to the present embodiment is characterized in that the permanent magnet 18 is provided on the rotor core 19 and the stator 16 in the vicinity thereof is composed of a winding coil. In the commutatorless motor 6' having this configuration, the same plate 23 as that of the first embodiment is disposed on the rear end (which is first inserted into the motor case 5 when mounting the commutatorless motor 6') of the rotor core 19.

Accordingly, in the present embodiment, the same effect as that of the first embodiment is obtained by the guide of the plate 23 and the commutatorless motor 6' can be smoothly mounted without excess working power or man-hour.

The present invention is applicable to an electrical tool in which a permanent magnet motor is mounted as a driving source in a housing which is integrally formed in a tube shape, in addition to a portable electrical circular saw.

What is claimed is:

1. An electrical tool in which a permanent magnet motor is mounted in a housing which is integrally formed in a tube shape, the permanent magnet motor includes a stator fixed to an inner circumferential surface of the housing and a rotor which has a rotor core and is rotatably disposed in the stator, a plate having a plurality of protrusions is disposed on at least one of the axial ends of the rotor core of the rotor, and rotation of the permanent magnet motor is delivered to the tool to drive the tool, wherein an outer diameter of at least two protrusions of the plate is larger than an outer diameter of the rotor core and smaller than an inner diameter of the stator; and the plate is disposed at a front end of a direction for inserting the rotor into the stator when the permanent magnet motor is mounted.

2. The electrical tool according to claim 1, wherein the protrusions of the plate are disposed at positions other than the axial ends of the stator in an axial direction.

3. The electrical tool according to claim 1, wherein at least one of the protrusions of the plate having the outer diameter is positioned in inner surfaces of permanent magnets of the stator including a plurality of permanent magnets having different poles in a circumferential direction.

4. The electrical tool according to claim 3, wherein the end of a shaft for supporting the rotor at a side of the plate is rotatably supported by a housing bearing portion through a bearing, and wherein, when a distance from an end of a rotor inserting side of the permanent magnets of the stator to a surface of a bearing which is fitted into the housing bearing portion is A, a distance from an end of the rotor core side of the protrusions of the plate to the surface of the bearing which is fitted into the housing bearing portion is B, and a distance from the end of the rotor inserting side of the permanent magnets of the stator to an axial end of an opening side of the housing bearing portion is C, the distances A, B, and C satisfy a relationship of C<B<A.

5. The electric tool according to claim 1, wherein the protrusions of the plate are disposed at positions other than at axial ends of the stator in an axial direction.

6. The electrical tool according to claim 1, wherein at least one of the protrusions of the plate having the outer diameter is positioned in inner surfaces of permanent magnets of the stator including a plurality of permanent magnets having different poles in a circumferential direction.

7. The electrical tool according to claim 2, wherein at least one of the protrusions of the plate having the outer diameter is positioned in inner surfaces of permanent magnets of the stator including a plurality of permanent magnets having different poles in a circumferential direction.

8. The electrical tool according to claim 4, wherein the protrusions of the plate function as a guide for coaxially holding the shaft which supports the rotor with respect to the stator such that axial misalignment between a bearing mounted on one of the ends of the shaft and a housing bearing portion mounted on the inner surface of the housing is prevented until the bearing is inserted into the housing bearing portion.

9. The electrical tool according to claim 5, wherein since the protrusions are positioned other than at the axial ends of the stator in the axial direction in a state that the commutator is mounted, the plate which rotates while the commutator is driven does not come in contact with the permanent magnet.

10. The electrical tool according to claim 1, wherein since an outer diameter of the protrusions of the plate is slightly smaller than an inner diameter of the stator, an interval between the protrusions and the inner circumferential surface of the stator becomes smaller.

11. The electrical tool according to claim 1, wherein since the protrusions of the plate which rotate at a high speed blow off dust, the amount of dust sucked into the housing together with air through a window of the housing by rotation of a cooling fan is lessened between the rotor core and the stator.

12. The electrical tool according to claim 1, wherein said permanent magnet motor includes a plurality of permanent magnets on the rotator core and the stator includes a winding coil.

13. The electric tool according to claim 1, wherein said permanent magnet motor includes a plurality of permanent magnets on the rotator core and the stator includes a winding coil.

* * * * *